United States Patent [19]

Iima et al.

[11] Patent Number: 5,486,688
[45] Date of Patent: Jan. 23, 1996

[54] NON-SCANNING TYPE OPTICAL READING APPARATUS HAVING ILLUMINATING EQUALIZATION FILTER

[75] Inventors: Mitsunori Iima; Kazuya Hara; Atsumi Kaneko, all of Tokyo, Japan

[73] Assignee: Asahi Kogaku Kogyo Kabushiki Kaisha, Tokyo, Japan

[21] Appl. No.: 904,307

[22] Filed: Jun. 25, 1992

[30] Foreign Application Priority Data

Jun. 26, 1991 [JP] Japan ................................. 3-154942

[51] Int. Cl.$^6$ ........................................................ G06K 7/10
[52] U.S. Cl. ........................... 235/462; 235/472; 359/888
[58] Field of Search ............................ 235/462, 472, 235/467; 359/888

[56] References Cited

U.S. PATENT DOCUMENTS

| | | | |
|---|---|---|---|
| 3,571,603 | 3/1971 | Bryant et al. | 250/550 |
| 3,746,868 | 7/1973 | Plocki . | |
| 4,195,223 | 3/1980 | Bergmann et al. . | |
| 4,302,673 | 11/1981 | Bly | 250/332 |
| 4,408,120 | 10/1983 | Hara et al. | 235/472 X |
| 4,496,831 | 1/1985 | Swartz et al. | 235/467 X |
| 4,818,856 | 4/1989 | Matsushima et al. | 235/462 |
| 4,900,907 | 2/1990 | Matusima et al. | 235/454 X |
| 5,057,687 | 10/1991 | Leyshon et al. | 250/239 |
| 5,107,529 | 4/1992 | Boone | 359/890 |
| 5,111,343 | 5/1992 | Harrigan | 359/888 |
| 5,135,298 | 8/1992 | Feltman | 351/163 |

FOREIGN PATENT DOCUMENTS

| | | | |
|---|---|---|---|
| 385478 | 9/1990 | European Pat. Off. | 235/462 |
| 2379084 | 8/1978 | France . | |
| 58-8381 | 1/1983 | Japan | 235/462 |
| 61-54570 | 3/1986 | Japan | 235/462 |
| 62-147577 | 7/1987 | Japan | 235/472 |
| 1-123384 | 1/1989 | Japan | 235/462 |
| 1-41079 | 2/1989 | Japan | 235/462 |
| 205580 | 7/1992 | Japan | 235/462 |

OTHER PUBLICATIONS

L. A. Febin et al, A Method of Equalizing Image Illumination in an Optical Instrument, Soviet Journal of Optical Technology, vol. 39 No. 5, May 1972 pp. 307–308.
Anonymous, Method of Fabricating Low Cost Relative Illumination Filters, Research Disclosure, Dec. 1979 p. 678.
Cunnigham et al, "Optical System for Uniform Light Distribution", *IBM Technical Disclosure Bulletin*, vol. 18, No. 12, May 1976, New York, p. 4122.
French Search Report FR 9207931.
Search Report No. GB 9213267.9 dated Sep. 3, 1992 citing USP 4,195,223.

*Primary Examiner*—John Shepperd
*Attorney, Agent, or Firm*—Sughrue, Mion, Zinn, Macpeak & Seas

[57] ABSTRACT

A non-scanning type optical reading apparatus for reading patterns such as a bar code. The optical reading apparatus comprises an imaging lens for imaging a bar code as a pattern to be read, a CCD line sensor for reading the information of the image of the pattern, and a light damping mirror and/or filter that is provided between the pattern and the CCD line sensor. The central part of the light damping mirror filter is denser than the periphery to achieve a uniform distribution of light on the sensor. According to one embodiment, the filter is a bandpass filter.

9 Claims, 16 Drawing Sheets

NON-SCANNING TYPE OPTICAL READING APPARATUS HAVING ILLUMINATING EQUALIZATION FILTER

BACKGROUND OF THE INVENTION

The present invention related to a non-scanning type optical reading apparatus for reading patterns such as a bar code, an image of which is formed on a photosensor.

Conventional optical reading apparatus of the type contemplated by the present invention illuminate a pattern such as a bar code with a light source including LEDs for example, so that the reflected light from the pattern is projected on a light-receiving element such as a CCD line sensor by means of an imaging lens to read the information of the pattern from the output thereof.

In the conventional optical reading apparatus, the reflected light from the uniformly illuminated pattern is imaged, so the $\cos^4$ power law of the imaging lens causes light attenuation, whereby the line sensor receives less light in its periphery than in the central area. If the image on the line sensor is not uniform in the distribution of light quantity, it becomes difficult to set a threshold level in the circuit for processing the output of the line sensor. As a result, the information of the pattern can potentially be read incorrectly or the information thereof cannot be read on account of a setting error.

Apparatus such as a copying machine and a facsimile machine use a shading plate for correcting the light quantity. Compared with copying machines and facsimile machine, bar code readers use less bright lenses having large F numbers. Since such dark lenses transmit only a bundle of rays having a small diameter, the range of errors that are permissible for the size and position of the shading plate is relatively narrow. Hence, in case of using shading plates, it takes time to manufacture and install them, making the completed optical system quite unsuitable for large-scale production.

SUMMARY OF THE INVENTION

The present invention has been accomplished under these circumstances, and an object of the invention is to provide an optical reading apparatus that is capable of reading information correctly by insuring that the image of a pattern to be formed on a light-receiving element will have a uniform distribution of light quantity.

The above, and other objects of the present invention can be attained by an optical reading apparatus comprising an imaging lens for imaging a pattern as an object to be read, a light-receiving means for reading the information of the image of the pattern, and a damping means provided between said pattern and said light-receiving means to insure that a damping amount in the portion of a light beam directed toward the central area of said light-receiving means is larger than a damping amount in portion of a light beam directed toward the periphery. The damping means includes an optical member capable of attenuating the quantity of a light beam optically.

It should be noted that the optical reading apparatus according to the present invention is available for reading a two-dimensional image including information pattern to be read.

The present disclosure relates to the subject matter contained in Japanese patent application No. 154942/1991 (filed on Jun. 26, 1991) which is expressly incorporated herein by reference in its entirety.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the accompanying drawings.

DESCRIPTION OF THE PREFERRED EMBODIMENTS

The present invention will be described hereinafter with reference to the accompanying drawings.

Figure 1:
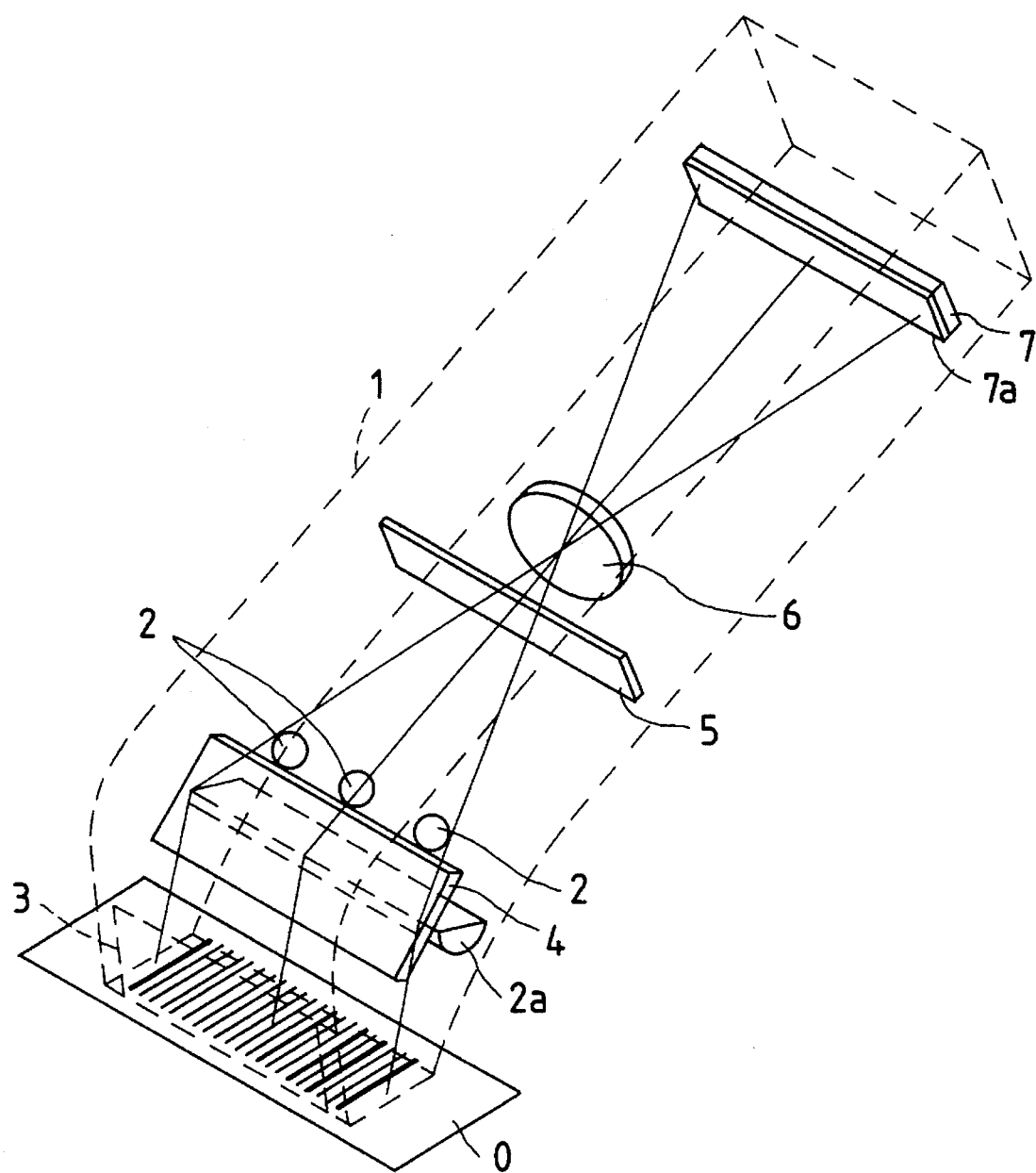
FIG. 1 is a perspective view showing the composition of a bar code reader according to a first embodiment of the present invention.

FIG. 1 is a schematic diagram showing a first embodiment of the present invention in which the optical reading apparatus of the invention is used as a bar code reader.

The bar code reader comprises a casing 1 that has an opening at the distal end and which accommodates the following components: a light source including three LEDs 2 that illuminate a bar code O (an object to be read) via a cylindrical illuminating lens 2a; a transparent plate 3 provided near the opening in the casing for admitting ambient light; a mirror 4 for bending back the reflected light from the bar code O; a bandpass filter 5; an imaging lens 6; and a CCD line sensor 7 as a light-receiving element furnished with a front cover glass 7a.

The mirror 4 is provided with a coating that has a lower reflection factor in the central area than in the periphery and which hence serves as a damping element.

Figure 2:
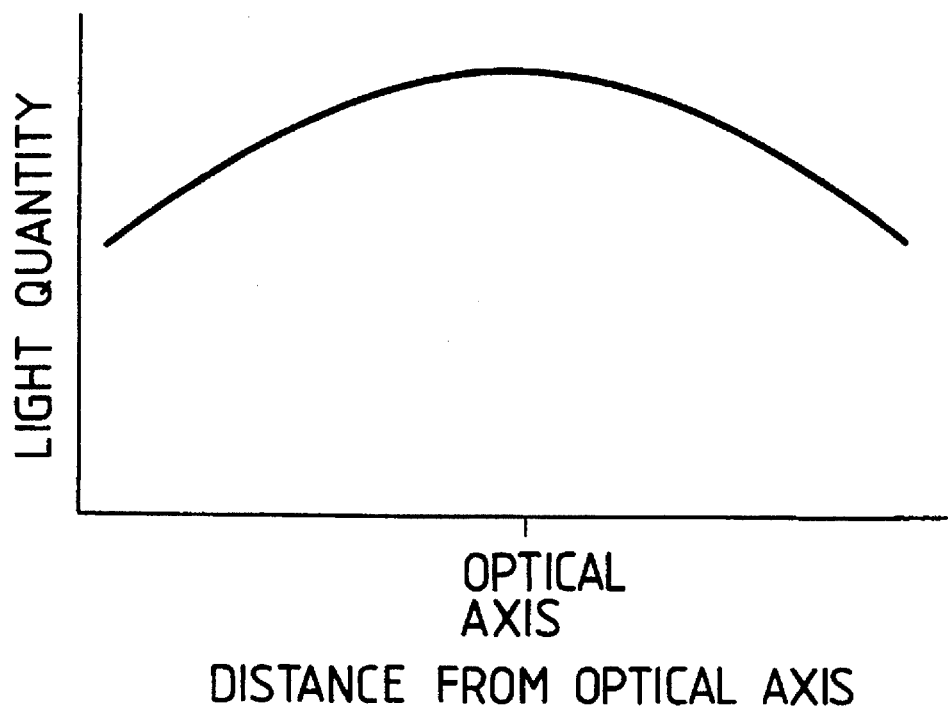
FIG. 2 is a graphical representation showing the distribution of light quantity over a line sensor in the absence of a damping element.
Figure 3:
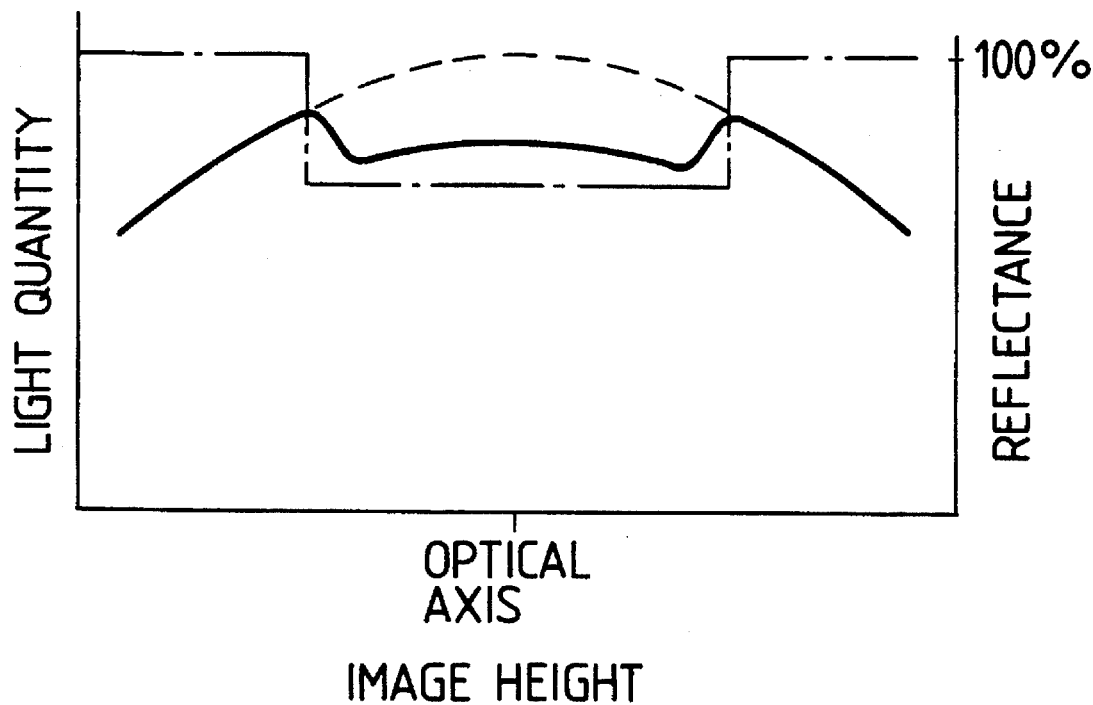
FIG. 3 is a graphical representation showing the reflection factor profile of a mirror and the distribution of light quantity over the line sensor in the presence of a damping element.

If the bar code is illuminated uniformly without the damping element, the $\cos^4$ power law of the imaging lens 6 provides a distribution of light quantity on the line sensor 7 as shown in FIG. 2, with less light being received in the periphery than in the central area. If the reflection factor of the mirror 4 has a central depression as indicated by a one-short-and-one-long dashed line in FIG. 3, the line sensor will have a distribution of light quantity as indicated by a solid line in FIG. 3. In these figures, a horizontal axis represents a distance from an optical axis of the optical system, and normalization is carried out based on a light beam impinging the outermost portion of the mirror or line sensor.

If the mirror 4 is provided with two areas having different levels of reflection factor, a great change in illuminance occurs in the transition zone. With an optical system such as a facsimile machine that reads image information, no transition for causing a great level difference is allowed, in order to avoid deterioration of image quality. On the other hand, a comparatively large level difference is permissible for an apparatus such as a bar code reader that reads a binary code consisting of white and black bands, if such a large level difference occurs continuously.

Figure 4:
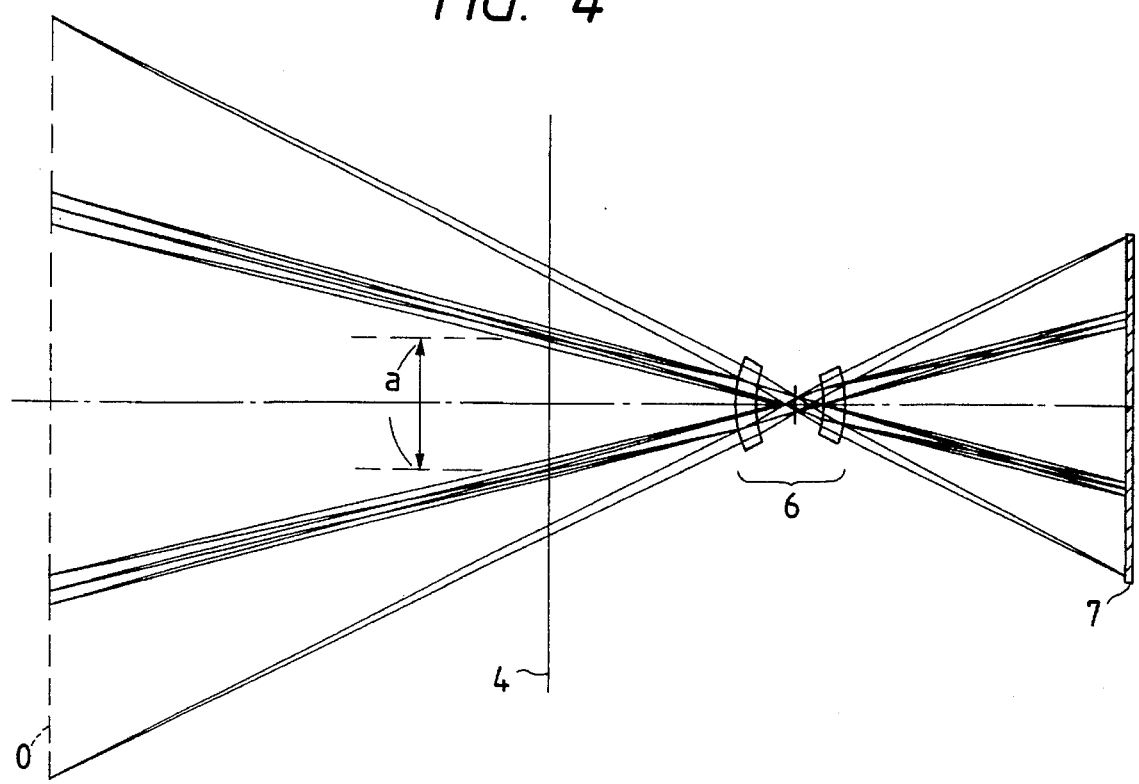
FIG. 4 is a diagram illustrating how a light beam is admitted into an imaging lens through a transition zone in the mirror.

The gradient of the transition zone decreases as the mirror 4 (damping element) is positioned closer to the imaging lens 6. This will be explained as follows. The closer to the imaging lens the mirror is, the thicker the light beam that issues from a single point on the bar code O (see FIG. 4 in which the low-transmission factor region of mirror 4 is indicated by a) and, hence, a greater portion of the reflected light from the bar code that is admitted into the imaging lens 6 will overlap with the transition zone of the reflection factor of the mirror thereby diminishing the effect of that transition zone.

The process of reading the pattern of bar code O proceeds as follows. The LEDs 2 are first lit to illuminate the bar code O so that the reflected light from the bar code O is further reflected by the mirror 4; at the same time, the distribution of the quantity of the reflected light is adjusted by the mirror 4 and it is transmitted through the band pass filter 5 and the imaging lens 6 to focus the image of the pattern on the CCD line sensor 7.

By means of the mirror 4, a damping amount in the quantity of a light beam directed to the central area of the CCD line sensor 7 is made larger than that in the quantity of light falling on the periphery and this effectively cancels the light attenuation caused by the imaging lens 6, whereby an image of the pattern that has a substantially uniform profile of light quantity is formed over the CCD line sensor.

A video signal delivered from the CCD line sensor 7 is fed to a decoder circuit (not shown) for analyzing the information contained in the pattern. If the ambient light is sufficiently bright, the light will be admitted through the transparent plate 3 to illuminate the bar code O, as a result of which no LEDs 2 are required to be lit to read the information of the pattern.

However, if ambient white light is used to form an image of the pattern, the chromatic aberration of the imaging lens 6 may prevent the image of the pattern from being correctly focused on the line sensor thereby resulting in lowering S/N ratio of information. To avoid this possibility, the first embodiment is provided with the bandpass filter 5 between the mirror 4 and the imaging lens 6 to yield monochromatic light, which can then be focused to produce a desired image that is free from the adverse effects of the chromatic aberration of the imaging lens. The bandpass filter 5 may be provided as a separate entity as shown in FIG. 1; alternatively, a coating that serves as a similar (bandpass) filter may be provided on the surface of the imaging lens 6.

In the first embodiment of the invention, the reflection factor of the mirror 4 is adapted to vary at two levels. If desired, the reflection factor of the mirror may be adjusted to vary at four levels as indicated by a solid line in FIG. 5 and this is advantageous for making the gradient of each transition zone gentle enough to provide uniformity for the overall illuminance.

Figure 5:
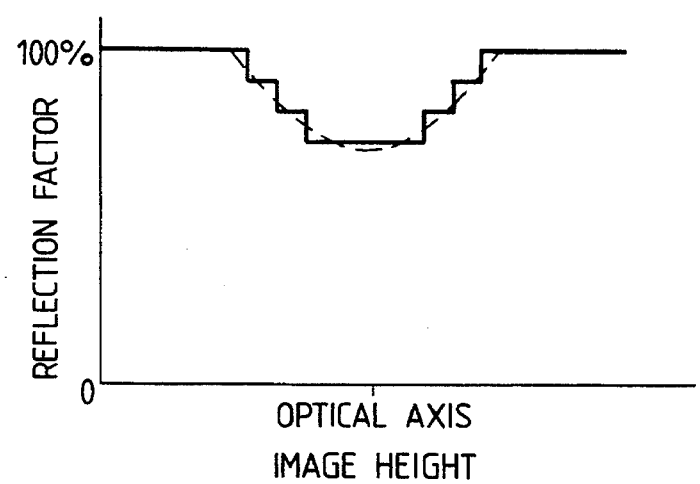
FIG. 5 is a graphical representation showing another reflection profile of the mirror.

The illuminance over the line sensor 7 can be made even more uniform by controlling the reflection factor of the mirror to vary continuously as shown by a dashed line in FIG. 5.

Figure 6:
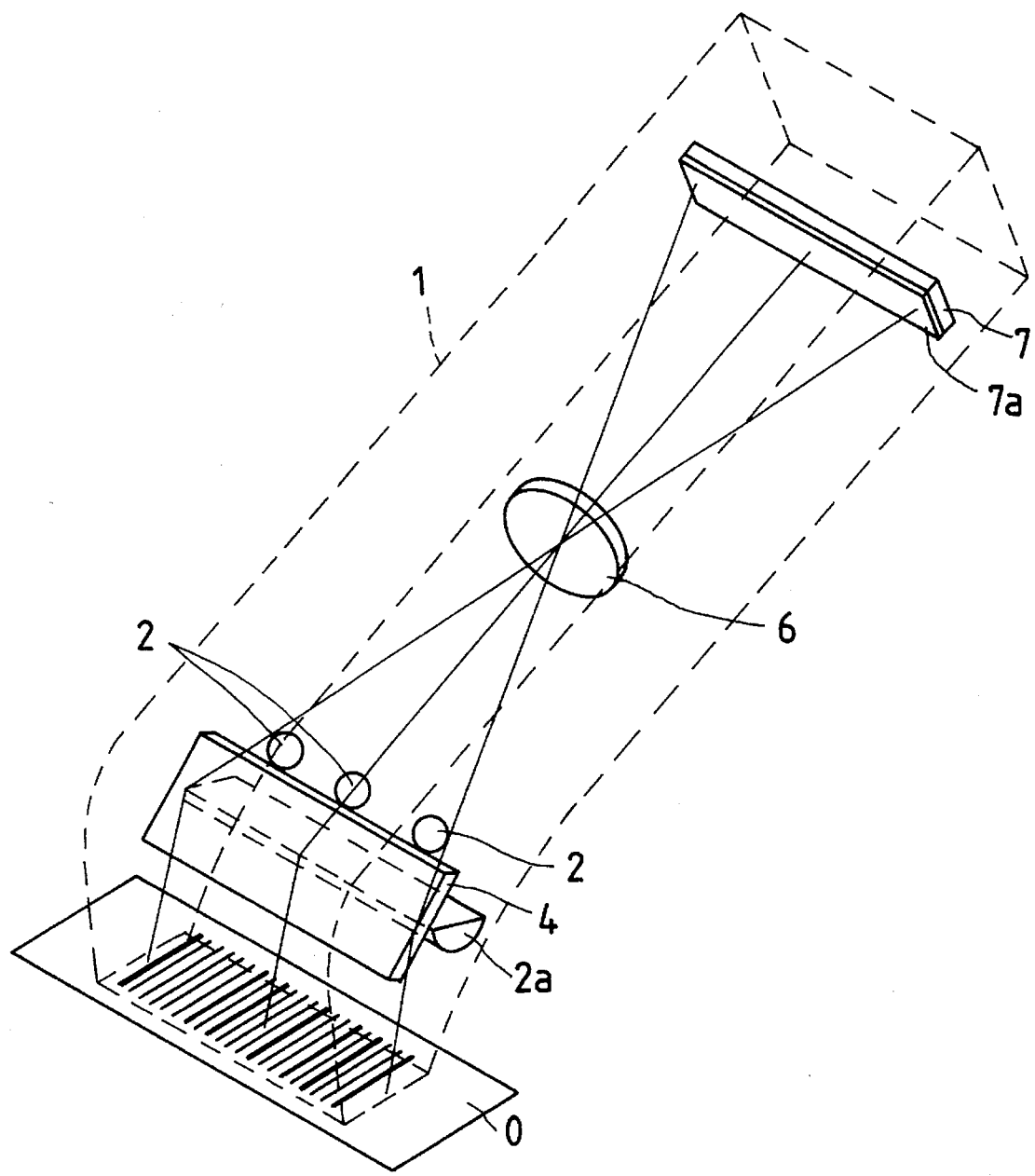
FIG. 6 is a perspective view showing the composition of a bar code reader according to a second embodiment of the present invention.

FIG. 6 is a schematic diagram showing a perspective view of a second embodiment of a bar code reader of the present invention.

The second embodiment comprises LEDs 2, a mirror 4 acting as a damping element, an imaging lens 6 and a CCD line sensor 7 furnished with a front cover glass 7a. In this second embodiment, ambient light is not used as in the first embodiment and, instead, the opening in the casing 1 is placed in intimate contact with the bar code 0 so that the bar code 0 is illuminated solely with the light from the LEDs 2, as a result of which the decrease in S/N ratio due to the chromatic aberration of the imaging lens can be prevented without using a bandpass filter.

Figure 16:
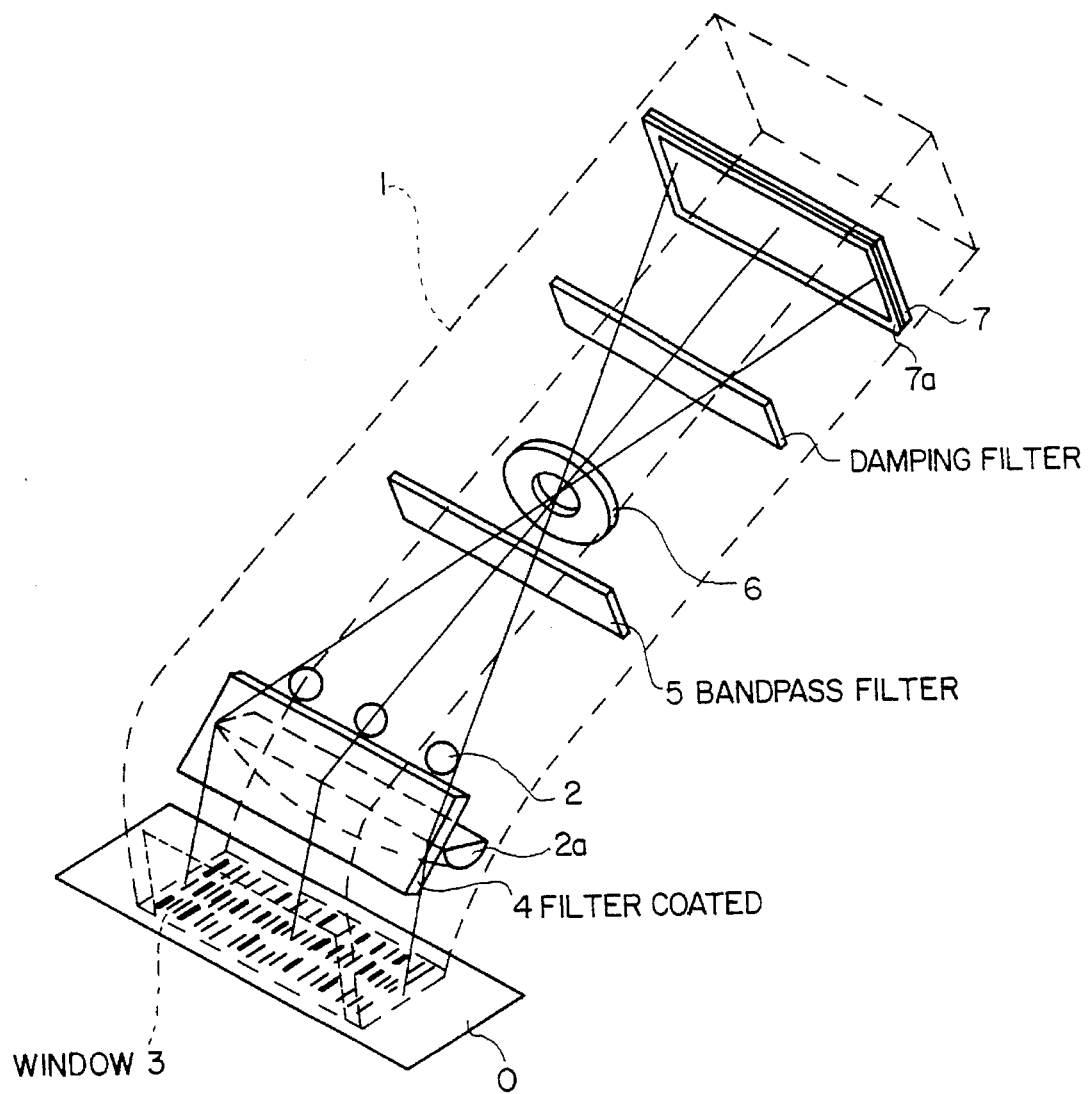
FIG. 16 is a schematic diagram showing a fourth embodiment of the present invention, which shows a bar code reader capable of reading a two-dimensional information.

The foregoing description of first and second embodiments of the invention assumes the case of using mirror 4 as a damping element. Alternatively, an ND (neutral density) filter having a lower transmission factor in the central area than in the periphery may be provided as a light attenuating filter in an optical path. In this case, the filter may be provided as a separate entity between the pattern to be read and the light receiving element but, if desired, the ND filter may be provided as a so-called optical filter separately, or the ND filter may be provided as a cover glass 7a in front of the line sensor. Alternatively, a coating that serves as a similar filter may be applied to the surface of the imaging lens 6. The alternative arrangements are shown in FIG. 16.

Figure 7A:
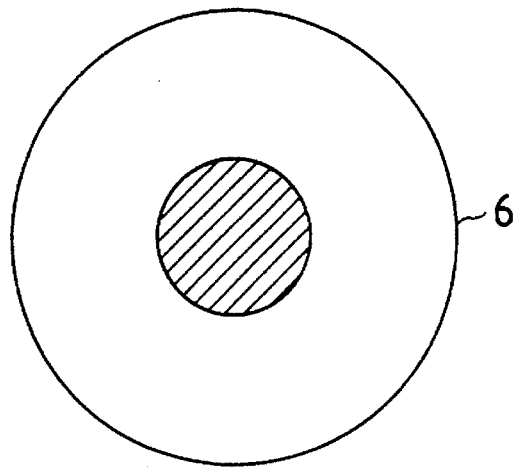
FIGS. 7(A) and 7(B) are diagrams showing a plan view of two examples of an ND filter coating that is provided on the imaging lens.
Figure 7B:
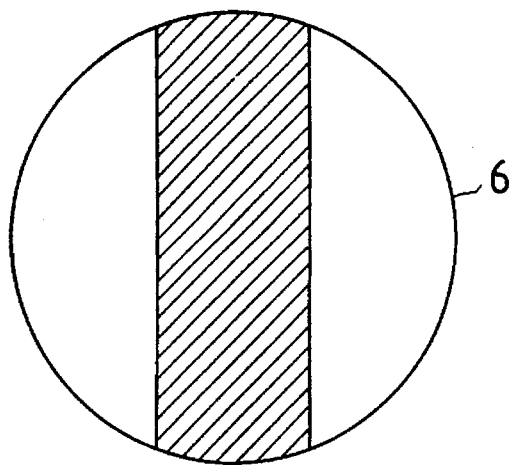

FIGS. 7(A) and 7(B) are schematic diagram showing two patterns of ND filter coating that can be applied to the surface of the imaging lens 6. In the figures, the region having low transmission factor is hatched and it may be circular as shown in FIG. 7(A) or in a strip form as shown in FIG. 7(B). The transmission factor of the ND filter can be not only adjusted to vary at two levels, it may also be varied at more than two levels or even continuously as already described in connection with the setting of the reflectance of mirror 4.

In the embodiments described above, a CCD line sensor is used as a light-receiving element to read one-dimensional information. To this end, the reflection factor of the mirror and the transmission factor of the ND filter need only to be considered for one direction. If it is required to read two-dimensional information, a 2D (two-dimensional) image sensor is used as a light-receiving element and the reflection factor of the mirror as a damping element or the transmission factor of the ND filter as an equivalent element is adjusted in such a way to vary continuously or stepwise, thereby providing a uniform distribution of illuminance over the sensor as the light receiving element.

Figure 8:
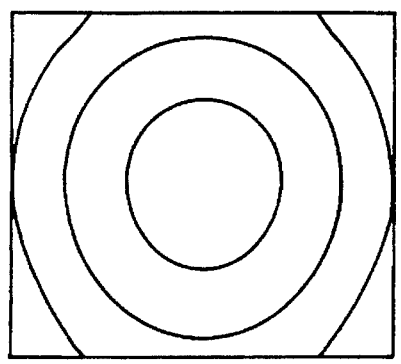
FIG. 8 is a diagram showing a transmission factor or reflection factor profile of the damping unit for the case of reading a two-dimensional code.

FIG. 8 is a schematic diagram showing one simple example of the ND filter having concentric regions where the transmission factors vary stepwise.

In general, since the mirror is arranged in such a manner that it is inclined to the optical axis, the reflection factor shows elliptic distribution. It should be noted that polygonal distribution such as rhombic distribution may be acceptable.

Further, the reflection factor distribution of the mirror or the transmission factor of the ND filter may be modified asymmetrically in accordance with distribution in light quantity of an illumination light on an information reading surface, so as to make light quantity on the 2D sensor substantially uniform.

The present invention is advantageous for reading two-dimensional information, because the shape of a light shielding plate becomes complicated in case of correcting the light quantity for reading two-dimensional information, and further high accuracy in mounting the light shielding plate is required resulting in difficulty in mounting.

Figure 9A:
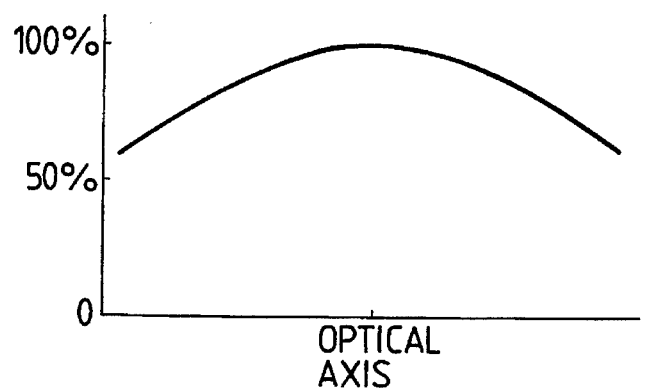
FIG. 9(A) is a graphical representation showing the distribution of light quantity on the line sensor, if the bar code is illuminated uniformly and is no damping element is provided.
Figure 9B:
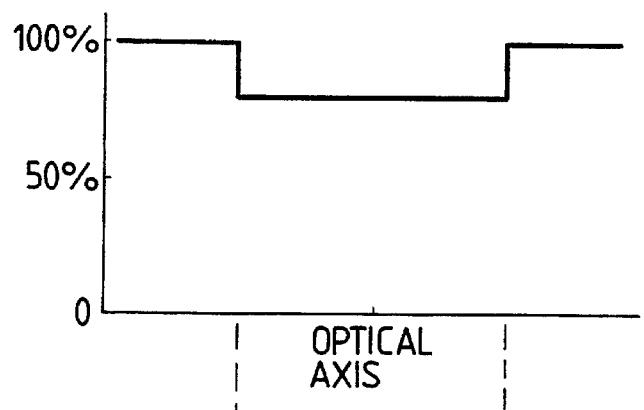
FIG. 9(B) is a graphical representation showing variation in transmission factor of the ND filter with regard to an optical axis.
Figure 9C:
FIG. 9(C) is a diagram showing a front view of an ND filter where circles indicate an example of bandle of rays.
Figure 9D:
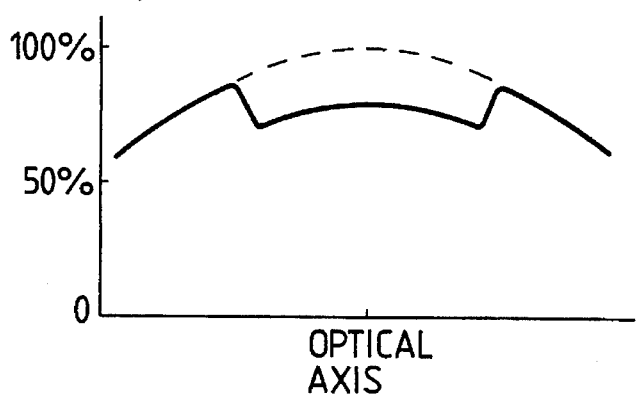
FIG. 9(D) is a graphical representation showing the distribution of light quantity on the sensor with an ND filter having such transmission factor that varies at two levels as shown in FIG. 9(B)

A distribution of light quantity on the line sensor 7 in case of using the ND filter as a light attenuation element will be described with reference to FIGS. 9(A) to 9(D). As is described above with reference to FIGS. 2 and 3, FIG. 9(A) is a graphical representation showing the distribution of light quantity on the sensor due to the $\cos^4$ power law of the imaging lens 6, if the bar code is illuminated uniformly is no damping element is provided. In FIG. 9(B), a solid line represents variation in transmission factor of the ND filter with regard to an optical axis, and FIG. 9(C) is a diagram showing a front view of an ND filter wherein circles indicate an example of bundle of rays. FIG. 9(D) is a graphical representation showing the distribution of light quantity on the sensor with an ND filter having such a transmission factor that varies at two levels as shown in FIG. 9(B).

Figure 10A:
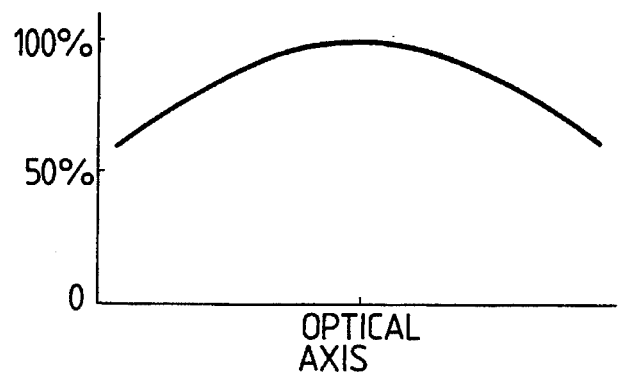
FIG. 10(A) is a graphical representation showing the distribution of light quantity on the sensor, if the bar code is illuminated uniformly and no damping element is provided.
Figure 10B:
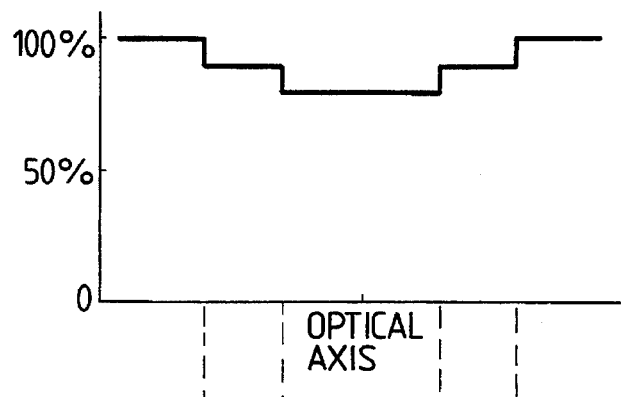
FIG. 10(B) is a graphical representation showing variation in transmission factor of the ND filter that varies at three levels with regard to the optical axis.
Figure 10C:
FIG. 10(C) is a diagram-showing a front view of an ND filter wherein circles indicate an example of bundle of rays.
Figure 10D:
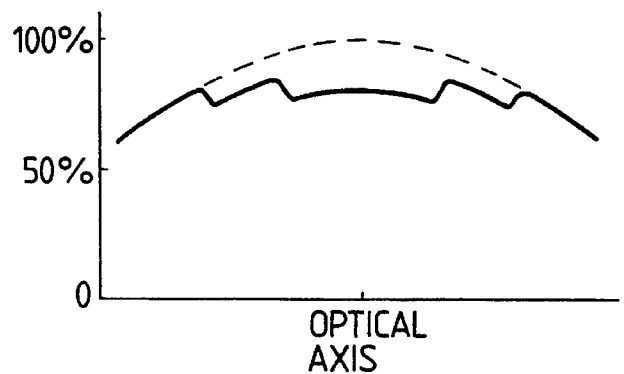
FIG. 10(D) is a graphical representation showing the distribution of light quantity on the sensor with the ND filter whose transmission factor varies as shown in FIG. 10(B)

FIG. 10(A) is also a graphical representation showing the distribution of light quantity on the sensor due to the above described law. In FIG. 10(B), a solid line represents variation in transmission factor of the ND filter that varies at three levels with regard to the optical axis. FIG. 10(C) is a diagram showing a front view of an ND filter wherein circles indicate bundle of rays. FIG. 10(D) is a graphical representation showing the distribution of light quantity on the sensor with the ND filter whose transmission factor varies as shown in FIG. 10(B).

Figure 11A:
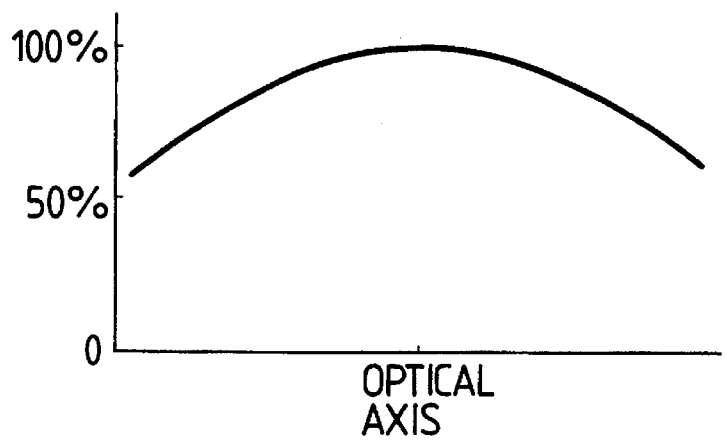
FIG. 11(A) is a graphical representation showing the distribution of light quantity on the sensor, if the bar code is illuminated uniformly and no damping element is provided.
Figure 11B:
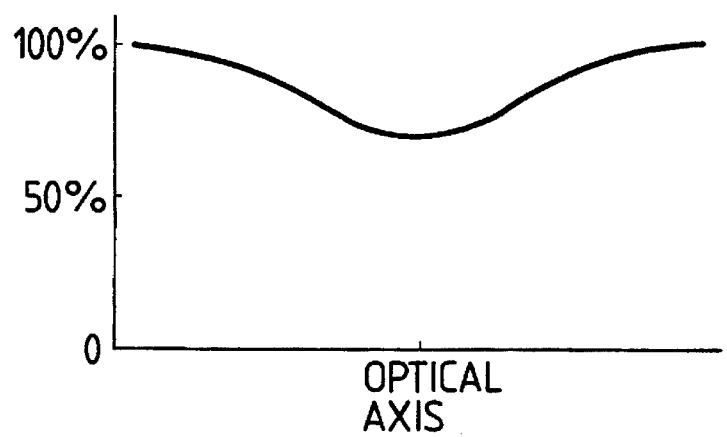
FIG. 11(B) is a graphical representation showing variation in transmission factor of the bandpass filter with regard to an optical axis.
Figure 11C:
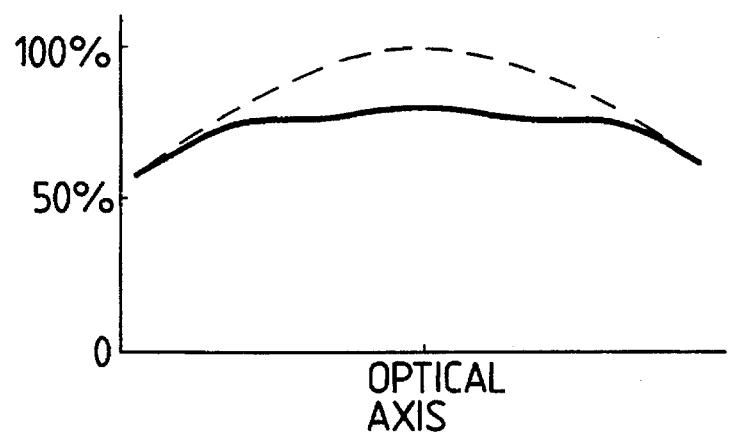
FIG. 11(C) is a graphical representation showing the distribution of light quantity on the sensor with the bandpass filter having such transmission factor as shown in FIG. 11(B)
Figure 13:
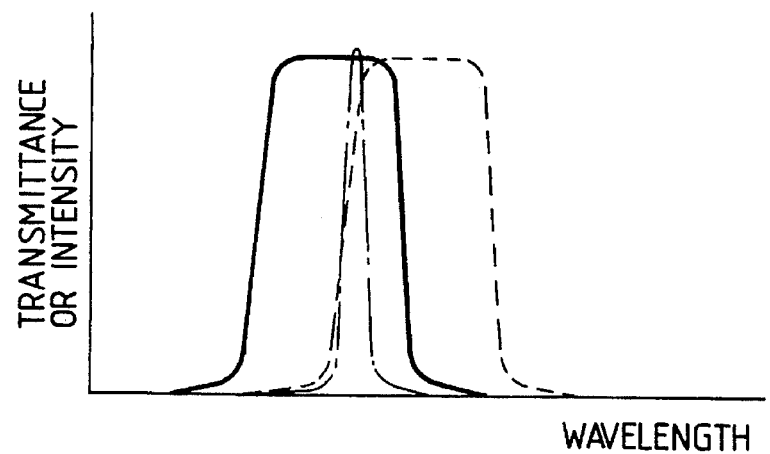
FIG. 13 is a graphical representation showing the relationship between the emission wavelength of an LED and two transmission factor profiles of a bandpass filter.

A distribution of light quantity on the line sensor 7 in case of using the bandpass filter as a light attenuation element will be described with reference to FIGS. 11(A) to 11(C). As is described hereinbefore with reference to FIG. 9(A), FIG. 11(A) is a graphical representation showing the distribution of light quantity on the sensor due to the $\cos^4$ power law of the imaging lens 6, if the bar code is illuminated uniformly and no damping element is provided. In FIG. 11(B), a solid line represents variation in transmission factor of the bandpass filter with regard to an optical axis, and the transmission characteristics of the bandpass filter is as shown in FIG. 13. FIG. 11(C) is a graphical representation showing the distribution of light quantity on the sensor with the bandpass filter having such a transmission factor as shown in FIG. 11(B).

Figure 12:
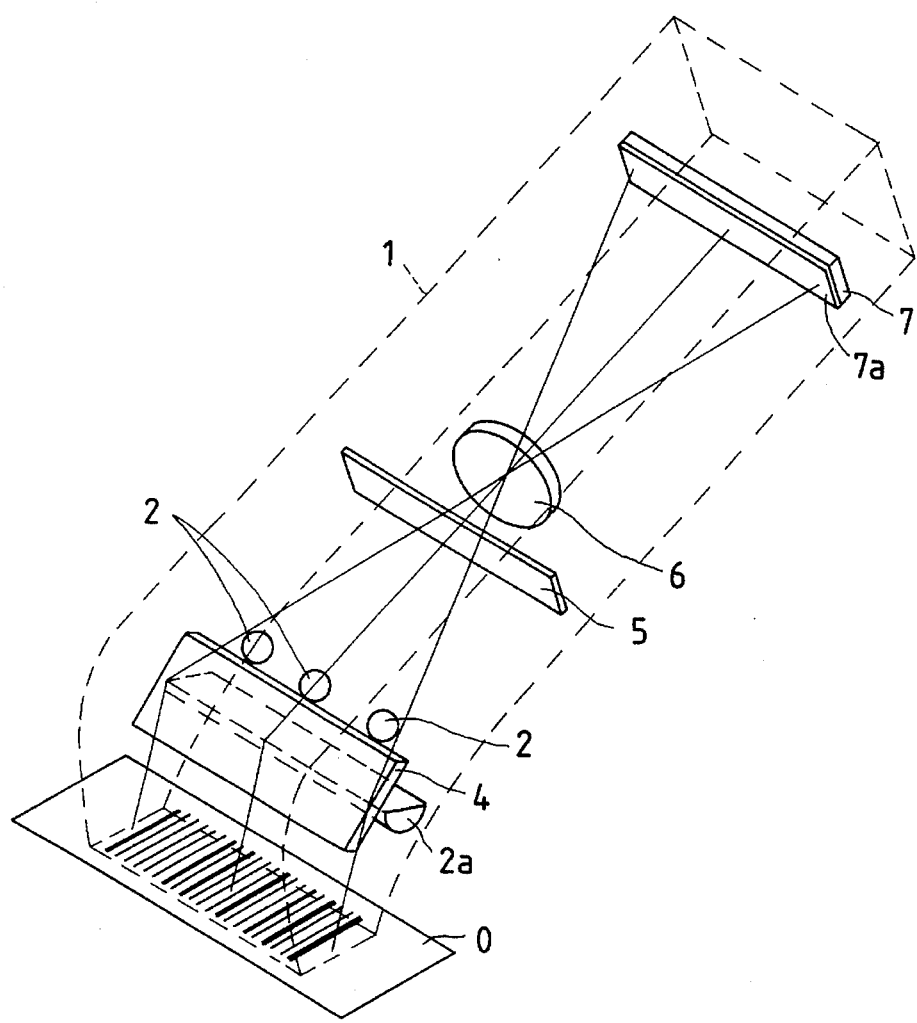
FIG. 12 is a perspective view showing the composition of a bar code reader according to a third embodiment of the present invention.

FIGS. 12 and 13 show a third embodiment of the present invention, which comprises LEDs 2, a mirror 4 as a damping element, a bandpass filter 5 acting as a light attenuation element, an imaging lens 6, and a CCD line sensor 7 fitted with a front cover glass 7a. The bandpass filter 5 has such characteristics that it shows a maximum transmission factor when rays of light emitting at the wavelength of LEDs 2 are incident off the axis while blocking part of the rays when they are incident on the axis.

Numerals commonly given in data sheets for the transmission factor of ordinary bandpass filters refer to values in association with rays of light that are incident normal to the filter. If the incident rays of light are not normal, the transmission factor curve makes an overall shift in wavelength from the curve for normal incidence, thus causing a change in the transmission characteristic of the filter. Under these circumstances, the bandpass filter 5 used in the third embodiment is designed in such a way that at the emission wavelength of LED 2, it shows a transmission characteristic as indicated by a dashed curve in FIG. 13 in case of normal incidence while showing a transmission characteristic as indicated by a solid curve in the case of incidence at an angle of, say, 20°. As a result, the quantity of a light beam directed toward the central area of the CCD line sensor 7 is attenuated compared to a light beam directed toward the periphery and, taken as a whole, the distribution of light quantity over the line sensor can be made more uniform than in the first and second embodiments. In place of the bandpass filter, a bandpass coating having an equivalent characteristic may be applied onto the surface of the imaging lens 6 or the cover glass 7a.

Figure 14A:
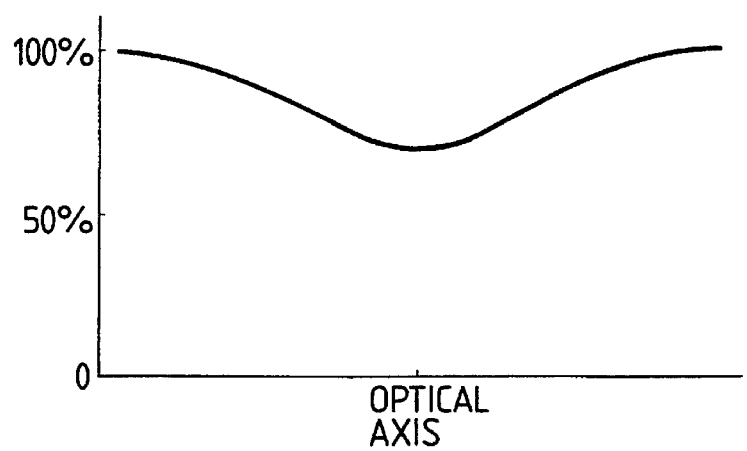
FIG. 14(A) is a graphical representation showing variation with regard to the optical axis in the transmission factor of the bandpass filter used in the third embodiment as shown in FIG. 12.
Figure 14B:
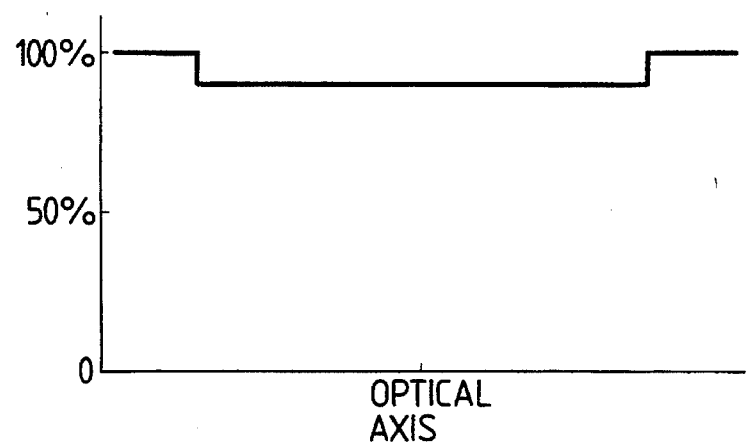
FIG. 14(B) is a graphical representation showing variation with regard to the optical axis in the reflection factor of the mirror of the third embodiment.
Figure 14C:
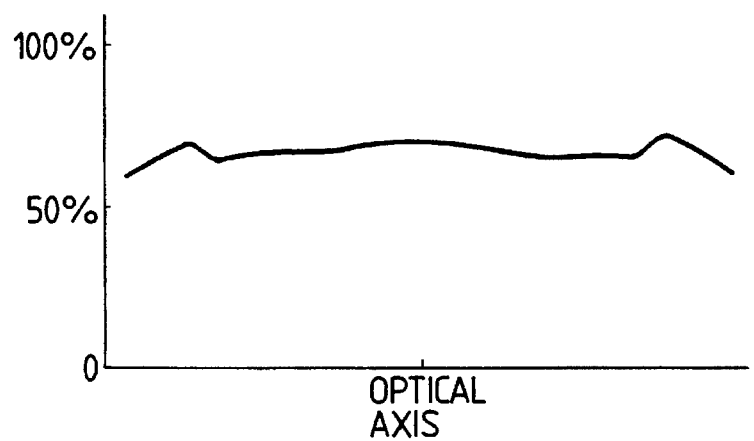
FIG. 14(C) is a graphical representation showing the distribution of light quantity on the sensor in case of using both the mirror acting as the light attenuation element and the bandpass filter.

FIG. 14(A) shows variation with regard to the optical axis in the transmission factor of the bandpass filter acting as a light attenuation element, which is used in the third embodiment as shown in FIG. 12 whereas FIG. 14(B) shows variation with regard to the same in the reflection factor of the mirror of the third embodiment. Further, FIG. 14(C) is a graphical representation showing the distribution of light quantity on the sensor in case of using both the mirror acting as the light attenuation element and the bandpass filter.

Figure 15A:
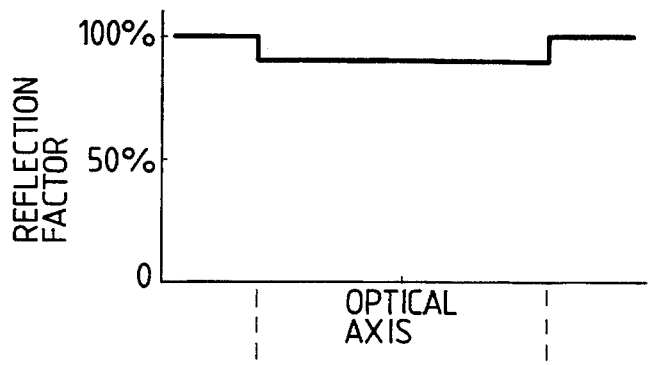
FIGS. 15(A) and 15(C) show variations with regard to the optical axis in the reflection factor of the mirror and the transmission factor of an ND filter used in an optical system as shown in FIG. 15(F)
Figure 15B:
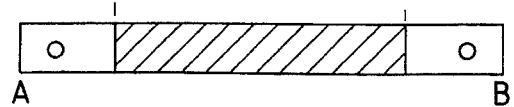
FIGS. 15(B) is a diagram showing a front view of a mirror and 15(D) is a diagram showing a front view of an ND filter where circles indicate bundle of rays, when one of the mirror and filter is independently employed.
Figure 15C:
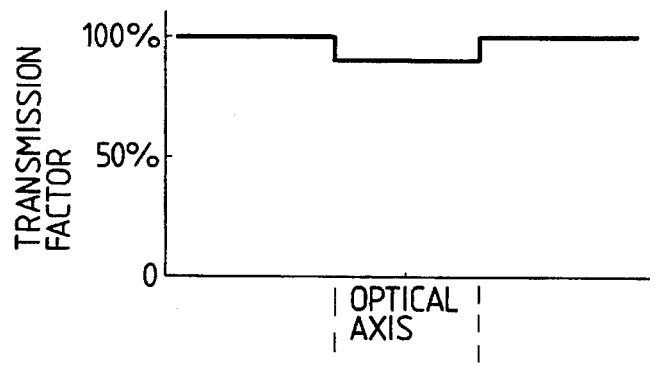
Figure 15D:
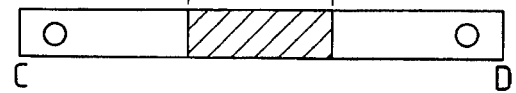
FIG. 15(E) is a graphical representation showing the distribution of light quantity on the sensor in case of using both the mirror acting as the light attenuation element and the ND filter acting as the damping element.
FIG. 15(F) is a diagram illustrating an optical system using the mirror and the bandpass filter whose optical characteristics are shown in FIGS. 15(A) and 15(C), respectively.
Figure 15E:
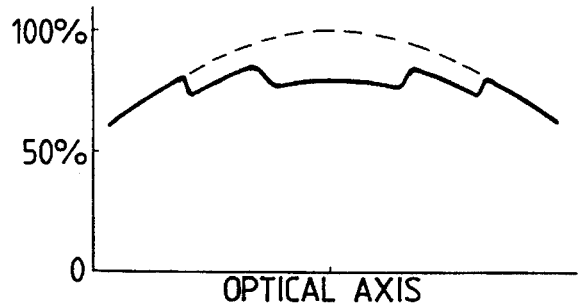
Figure 15F:
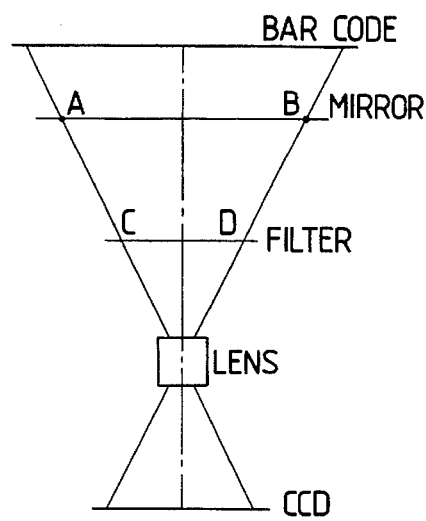

FIGS. 15(A) and 15(C) show variations with regard to the optical axis in the reflection factor of the mirror and the transmission factor of the ND filter used in an optical system as shown in FIG. 15(F). FIGS. 15(B) and 15(D) are diagrams showing front views of a mirror and an ND filter, respectively, when one of the mirror and filter is independently employed.

FIG. 15(E)) is a graphical representation showing the distribution of light quantity on the sensor in case of using both the mirror acting as the light attenuation element and the ND filter.

FIG. 16 is a schematic diagram showing a fourth embodiment of the present invention, which shows a bar code reader capable of reading a two-dimensional information. This embodiment is substantially same ms that of FIG. 1 other than a pattern to be read being two-dimensional and the line sensor being replaced by the above-described 2D sensor. FIG. 16 illustrates various alternative damping arrangements including (1) lens 4 having a filter coating, (2) a damping filter, and (3) lens 6 having a coating thereon, similar to that shown in FIG. 7(a). These are alternative damping arrangements.

Figure 17A:
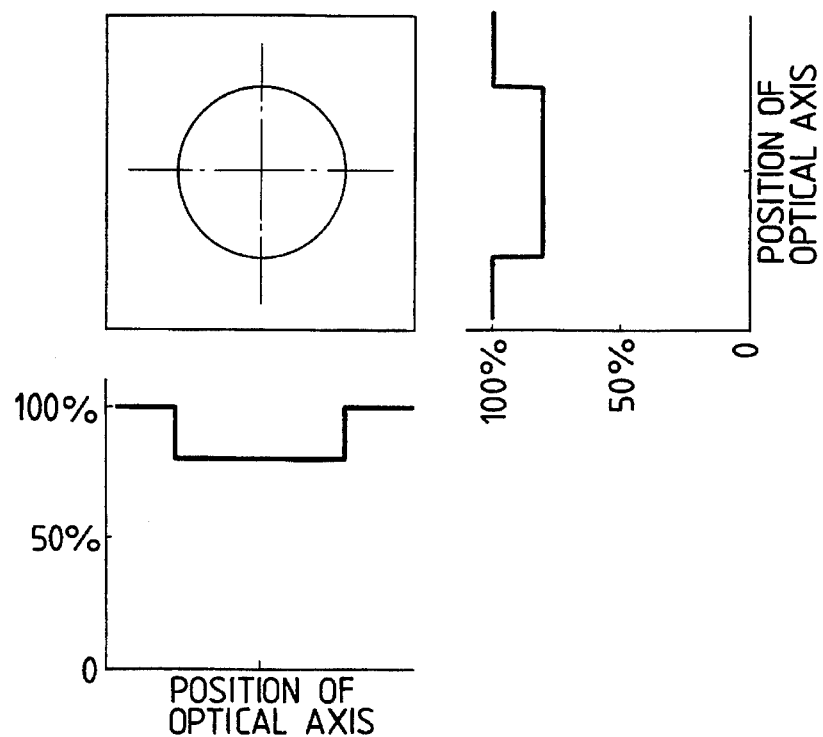
FIG. 17(A) is a diagram showing variation with regard to an optical axis in the reflection factor of a mirror which is employed as an attenuation element in a two-dimensional bar code reader as shown in FIG. 16.
Figure 17B:
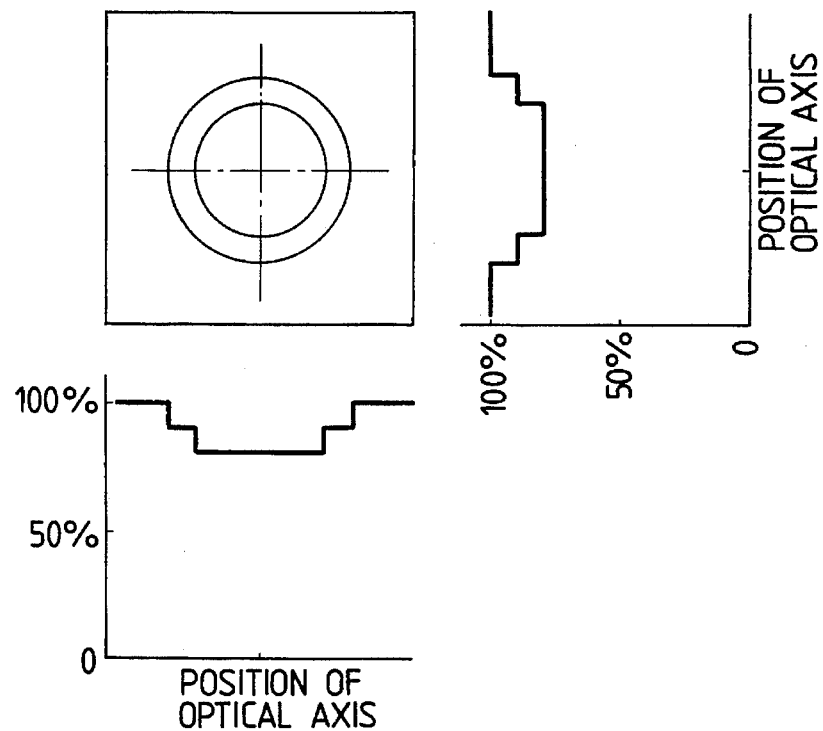
FIG. 17(B) is a graphical representation showing variation with regard to an optical axis in the reflection factor of a mirror, which varies at three levels.

FIG. 17(A) is a diagram showing variation with regard to an optical axis in the reflection factor of a mirror which is employed as an attenuation element in a two-dimensional bar code reader as shown in FIG. 16. As is clear from the drawing, the variation of the reflection factor, which varies at two levels, is shown in each of two directions, that is, in each of X and Y directions. FIG. 17(B) shows variation with regard to an optical axis in the reflection factor of a mirror, which varies at three levels.

Figure 18A:
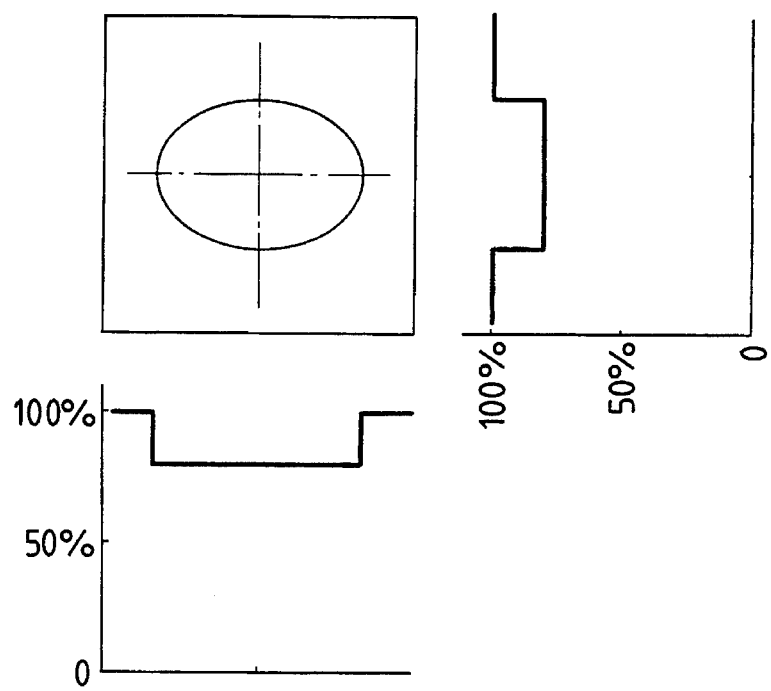
FIGS. 18(A) and 18(B) are also diagrams showing variation with regard to an optical axis in the reflection factor of a mirror, which are substantially same as those of FIGS. 17(A) and 17(B) except that the shape of lower level reflection factor regions are different.
Figure 18B:
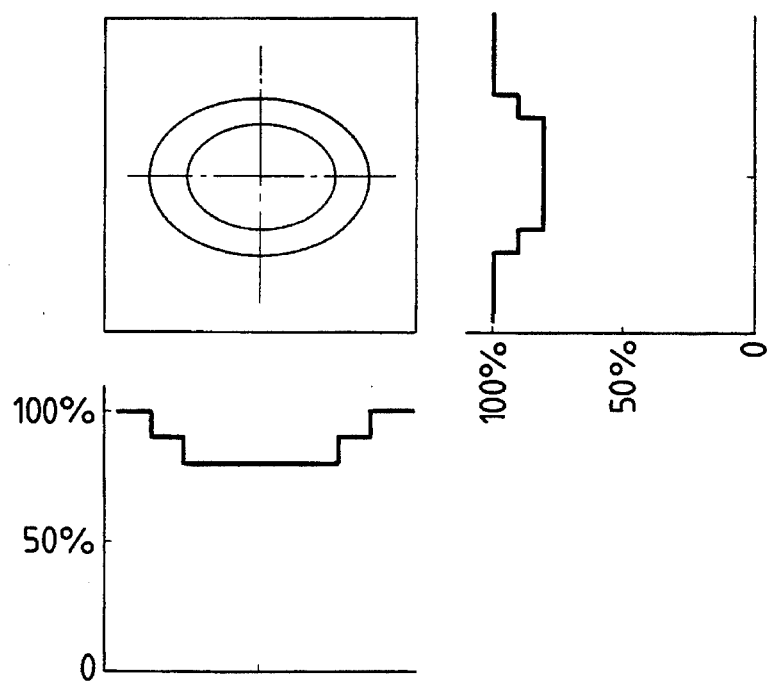

FIGS. 18(A) and 18(B) are also diagrams showing variation with regard to an optical axis in the reflection factor of a mirror, which are substantially same as those of FIGS. 17(A) and 17(B) except that the lower level reflection factor regions are different from each other in shape. In FIGS. 18(A) and 18(B), the lower level reflection factor region is of elliptical.

Figure 19A:
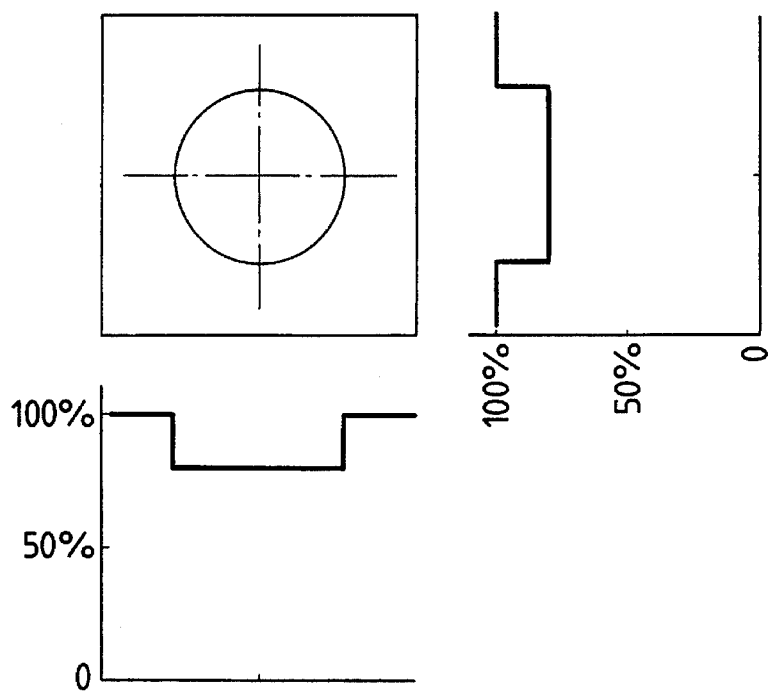
FIG. 19(A) is a diagram showing variation with regard to an optical axis in the transmission factor of an ND filter which is employed as an attenuation element in a two-dimensional bar code reader as shown in FIG. 16.
Figure 19B:
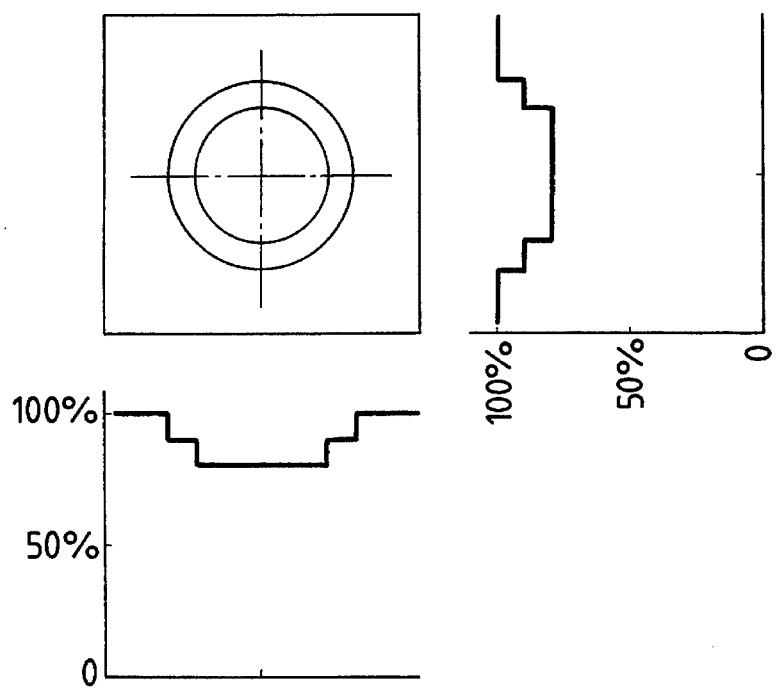
FIG. 19(B) is a graphical representation showing variation with regard to an optical axis in the transmission factor of the ND filter, which varies at three levels.

FIG. 19(A) is a diagram showing variation with regard to an optical axis in the transmission factor of an ND filter which is employed as an attenuation element in a two-dimensional bar code reader as shown in FIG. 16. As is clear from the drawing, the variation of the transmission factor, which varies at two levels, is shown in each of two directions, that is, in each of X and Y directions. FIG. 19(B) shows variation with regard to an optical axis in the transmission factor of the ND filter, which varies at three levels.

Figure 20A:
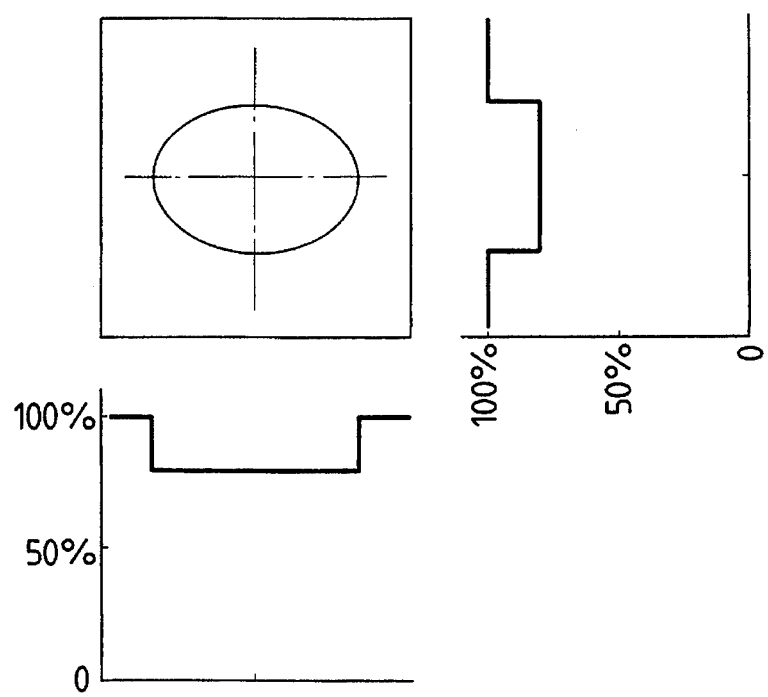
FIGS. 20(A) and 20(B) are also diagrams showing variation with regard to an optical axis in the transmission factor of an ND filter, which are substantially same as those of FIGS. 19(A) and 19(B) except that the shape of lower level reflection factor regions are different.
Figure 20B:
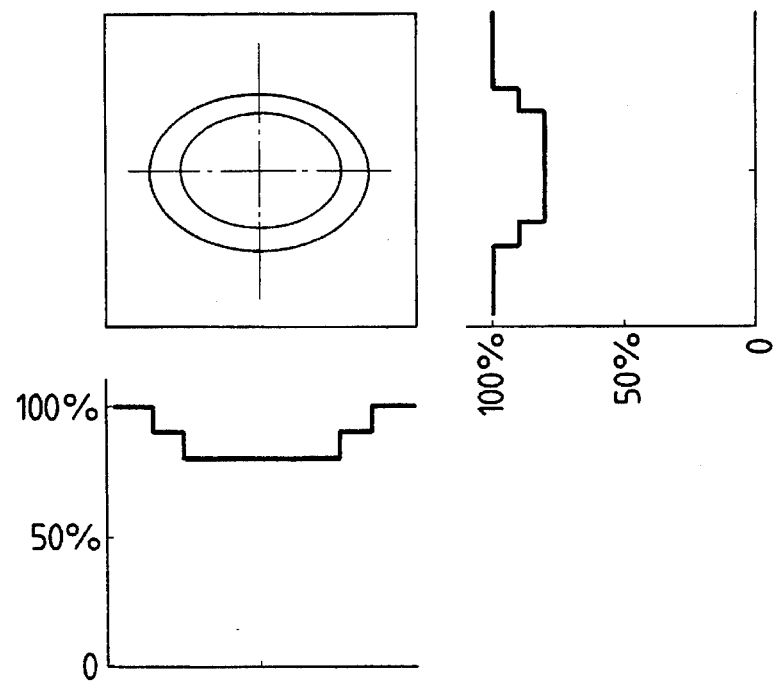

FIGS. 20(A) and 20(B) are also diagrams showing variation with regard to an optical axis in the transmission factor of an ND filter, which are substantially same as those of FIGS. 19(A) and 19(B) except that the lower level reflection factor regions are different from each other in shape. In FIGS. 19(A) and 19(B), the lower level reflection factor region is of elliptical.

Finally, when using a bandpass filter, the bandpass filter having characteristics as shown in FIG. 13 is also available as a light attenuation element in the two-dimensional bar code sensor.

As described above, the optical reading apparatus of the present invention is provided with a light attenuating element providing a constant distribution of light quantity over a light-receiving element. This facilitates the setting of a threshold level, and enables the correct reading of a pattern to be read.

What is claimed is:

1. An optical reading apparatus comprising:
   an imaging lens for imaging a two-dimensional pattern as an object to be read and forming a two-dimensional image thereof:
   light-receiving means for reading information from the two-dimensional image of the two-dimensional pattern, the two-dimensional image being formed by light travelling from the two-dimensional pattern to the light receiving means; and
   damping means for providing attenuation of the light provided to the light-receiving means, the attenuation varying in two dimensions depending on position of the light within the two-dimensional image, wherein said damping means is a bandpass filter for limiting the wavelength of said light reaching said light-receiving means, said bandpass filter being provided between said two-dimensional pattern and said light-receiving means and so set that given the wavelength of said light, a light component incident at an oblique angle to the bandpass filter will have a higher transmittance than a light component incident normal to the bandpass filter.

2. An optical reading apparatus comprising:
   an imaging lens for imaging a pattern as an object to be read and forming an image thereof;

light-receiving means for reading information from the image of the pattern, the image being formed by light travelling from the pattern to the light-receiving means; and damping means providing attenuation of the light, the attenuation varying depending on position of the light within the image, the damping means comprising at least two light attenuating devices, each of the at least two light attenuating devices being one of a light-attenuating reflecting mirror and a light-attenuating transmission filter, reflectance of the light-attenuating reflecting mirror varying with position along the surface of the mirror at which the light is reflected, and transmittance of the light-attenuating transmission filter varying with position along the surface of the filter through which the light is transmitted.

3. The optical reading apparatus according to claim 2 wherein said light-attenuating transmission filter varies in transmittance with regard to an optical axis provided between said pattern and said light-receiving means.

4. The optical reading apparatus according to claim 2 wherein said light-attenuating reflecting mirror is a mirror varying in reflectance with regard to an optical axis provided between said pattern and said light-receiving means.

5. The optical reading apparatus according to claim 2 further comprising an illumination structure for illuminating said pattern.

6. The optical reading apparatus according to claim 2 wherein said imaging lens, said light-receiving means and said damping means are accommodated within a housing that is provided with a window through which ambient light is guided to said pattern.

7. The optical reading apparatus according to claim 2 further comprising a bandpass filter provided between said pattern and said light-receiving means to limit the wavelength of said light reaching said light-receiving means.

8. The optical reading apparatus according to claim 2 wherein said light-attenuating transmission filter is a bandpass filter to limit wavelength of light reaching said light-receiving means, the bandpass filter being provided between said pattern and said light-receiving means and which is so set that given the wavelength of said light, a light component incident at an oblique angle to the bandpass filter will have a higher transmittance than a light component incident normal to the bandpass filter.

9. The optical reading apparatus according to claim 2 wherein said pattern and image are two-dimensional, and said transmittance and reflectance vary two-dimensionally depending on position of said light within said two-dimensional image.

* * * * *